(12) United States Patent
Baruschka et al.

(10) Patent No.: US 11,979,085 B2
(45) Date of Patent: May 7, 2024

(54) DC/DC CONVERTER SYSTEM AND CONTROL METHOD FOR FULL-BRIDGE DC/DC CONVERTER

(71) Applicant: Siemens Aktiengesellschaft, Munich (DE)

(72) Inventors: Lennart Baruschka, Wedemark (DE); Christopher Fromme, Fürth (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 18/249,881

(22) PCT Filed: Oct. 28, 2020

(86) PCT No.: PCT/CN2020/124500
§ 371 (c)(1),
(2) Date: Apr. 20, 2023

(87) PCT Pub. No.: WO2022/087910
PCT Pub. Date: May 5, 2022

(65) Prior Publication Data
US 2023/0308011 A1    Sep. 28, 2023

(51) Int. Cl.
*H02M 3/335* (2006.01)
*H02M 1/40* (2007.01)
*H02M 1/36* (2007.01)

(52) U.S. Cl.
CPC ......... *H02M 1/40* (2013.01); *H02M 3/33573* (2021.05); *H02M 3/33584* (2013.01); *H02M 1/36* (2013.01)

(58) Field of Classification Search
CPC ............. H02M 3/335; H02M 3/33573; H02M 3/33584; H02M 1/40
See application file for complete search history.

(56) References Cited

U.S. PATENT DOCUMENTS 10,110,138 B1 * 10/2018 Murthy-Bellur ........ H02M 1/36
2005/0286270 A1    12/2005 Petkov et al. ................... 363/17
(Continued)

FOREIGN PATENT DOCUMENTS

| CN | 103 414 347 | 11/2013 | ............ H02M 3/335 |
| CN | 108 039 822 | 5/2018 | |
| CN | 108 667 305 | 10/2018 | ............ H02M 3/335 |

OTHER PUBLICATIONS

Search Report for International Application No. PCT/CN2020/124500, 11 pages, dated Aug. 2, 2021.

(Continued)

*Primary Examiner* — Gary L Laxton
(74) *Attorney, Agent, or Firm* — Slayden Grubert Beard PLLC

(57) ABSTRACT

The teachings herein include DC/DC converter systems. An example system may include: a full-bridge converter and a switch control circuit. The converter includes a primary side and a secondary side full-bridge circuit and a transformer. AC nodes of the primary side are connected to a primary side of the transformer and AC nodes of the secondary side to a secondary side of the transformer. The switch control circuit: controls the primary side and the secondary side circuits in a normal operating phase including modulation of an input voltage by the primary side full-bridge circuit transferring power via the transformer, control the primary side and the secondary side in a free-wheeling phase during which they are both deactivated to reduce the transformer's magnetization current; and control the full-bridge circuits to switch between the normal operating phase and the free-wheeling phase alternately.

15 Claims, 10 Drawing Sheets

(56) References Cited

U.S. PATENT DOCUMENTS

| | | | |
|---|---|---|---|
| 2007/0070655 A1* | 3/2007 | Eguchi | H02M 1/10 363/17 |
| 2011/0317452 A1 | 12/2011 | Anguelov et al. | 363/21.02 |
| 2014/0185328 A1 | 7/2014 | Rosado | H02M 3/33538 |
| 2015/0098045 A1* | 4/2015 | Imanaka | H05B 45/385 315/185 R |
| 2015/0365005 A1* | 12/2015 | Panov | H02M 3/33584 307/24 |
| 2016/0365732 A1 | 12/2016 | Pahlevaninezhad | H02J 3/383 |
| 2021/0384840 A1* | 12/2021 | Kumar | H02M 1/32 |
| 2022/0393606 A1* | 12/2022 | Itogawa | H02M 3/33584 |

OTHER PUBLICATIONS

Australian Office Action, Application No. 2020475309, 3 pages, dated Jun. 2, 2023.

* cited by examiner

DC/DC CONVERTER SYSTEM AND CONTROL METHOD FOR FULL-BRIDGE DC/DC CONVERTER

CROSS-REFERENCE TO RELATED APPLICATIONS

This application is a U.S. National Stage Application of International Application No. PCT/CN2020/124500 filed Oct. 28, 2020, which designates the United States of America, the contents of which are hereby incorporated by reference in their entirety.

TECHNICAL FIELD

The present disclosure relates generally to Direct current (DC) to Direct current conversion. Some embodiments of the teachings herein include DC/DC converter systems and/or control methods for a full-bridge DC/DC converter.

BACKGROUND

DC/DC converters are used to convert a DC voltage into a different DC voltage in order to meet all kinds of industrial requirements. They often have an in-built transformer which allows for insulation between the primary side and the secondary side as well as for higher voltage transfer ratios. However, when a full-bridge is used to drive a transformer in a converter, a possible magnetic saturation of the transformer must be considered. It is possible to connect capacitors in series with the primary side and/or the secondary side of the transformer, however, this becomes impractical and cost ineffective once the converter current gets too large.

SUMMARY

The teachings of the present disclosure include systems and/or methods to prevent magnetic saturation of the transformer without using any capacitors in series connection with the transformer or any potentially expensive measurement circuitry for the transformer magnetization and a system and control method for a full-bridge DC/DC converter are provided to solve the described magnetic saturation problem. For example, some embodiments include a DC/DC converter system comprising a full-bridge DC/DC converter and a switch control circuit (140), the full-bridge DC/DC converter further comprising at least a primary side full-bridge circuit (110), a secondary side full-bridge circuit (120) and a transformer (130), AC nodes of the primary side full-bridge circuit (110) being connected to a primary side of the transformer (130), AC nodes of the secondary side full-bridge circuit (120) being connected to a secondary side of the transformer (130), wherein the switch control circuit (140) is configured to: control the primary side full-bridge circuit (110) and the secondary side full-bridge circuit (120) to operate in a normal operating phase during which modulation of an input voltage by the primary side full-bridge circuit (110) is performed to transfer power via the transformer (130); control the primary side full-bridge circuit (110) and the secondary side full-bridge circuit (120) to operate in a free-wheeling phase during which the primary side full-bridge circuit (110) and the secondary side full-bridge circuit (120) are both deactivated to reduce the transformer (130)'s magnetization current; and control the primary side full-bridge circuit (110) and the secondary side full-bridge circuit (120) to switch between the normal operating phase and the free-wheeling phase alternately.

In some embodiments, the switch control circuit (140) is further configured to control, during an active demagnetization phase, the modulation of the input voltage by the primary side full-bridge circuit (110) to reduce the magnetization current of the transformer (130) to a preset threshold, wherein the active demagnetization phase occurs at the end of the normal operating phase and before the free-wheeling phase; and during the free-wheeling phase, the primary side full-bridge circuit (110) and the secondary side full-bridge circuit (120) are both deactivated to continue to reduce the transformer (130)'s magnetization current from the preset threshold.

In some embodiments, the switch control circuit (140) is further configured to use the secondary side full-bridge circuit (120) together with the primary side full-bridge circuit (110) in the active demagnetization phase to reduce the magnetization current of the transformer (130) to the preset threshold while transferring energy across the converter system.

In some embodiments, the switch control circuit (140) is further configured to control, during a start-up phase, the modulation of the input voltage by the primary side full-bridge circuit (110) such that a target operating point is reached before entering the normal operating phase, wherein the start-up phase is before the normal operating phase and after the free-wheeling phase.

In some embodiments, the switch control circuit (140) is further configured to control the start-up phase by: activating, at the end of the free-wheeling phase, the secondary side full-bridge circuit to output a second secondary side voltage at the AC nodes of the secondary side full-bridge circuit and the primary side full-bridge circuit (110) to output a first primary side voltage for a first time duration that is long enough to change the stray inductance current of the transformer (130) to a desired value; activating, after the first time duration, the secondary side full-bridge circuit to output a first secondary side voltage to transfer energy for a second time duration that is long enough to transfer a first part of the energy from the primary side to the secondary side; and activating the primary side full-bridge circuit (110) to output a second primary side voltage for a third time duration that is long enough to transfer a second part of the energy from the transformer (130)'s stray inductance to the secondary side to end the start-up phase, either of the first primary side voltage and the first secondary side voltage being larger than either of the second primary side voltage and the second secondary side voltage.

In some embodiments, the normal operating phase comprises a first normal operating cycle, and the switch control circuit (140) is further configured to control the normal operating phase by: activating the primary side full-bridge circuit (110) to output a third primary side voltage and staying in this state for a fifth time duration long enough to reach a desired current in the transformer (130)'s stray inductance; activating the secondary side full-bridge circuit to output a third secondary side voltage to transfer energy from the primary side to the secondary side for a sixth time duration; and activating the primary side full-bridge circuit (110) to output the second primary side voltage for a seventh time duration to transfer energy from the transformer (130)'s stray inductance to the secondary side to end the first normal operating cycle, either of the third primary side voltage and the third secondary side voltage being larger than either of the second primary side voltage and the second secondary side voltage, the polarity of the first primary side voltage or the first secondary side voltage being the opposite to the polarity of the third primary side voltage or the third secondary side voltage.

In some embodiments, the normal operating phase further comprises a second normal operating cycle after the first normal operating cycle, and the switch control circuit (140) is further configured to control in the normal operating phase by: starting the second normal operating cycle by activating the secondary side full-bridge circuit to output the second secondary side voltage and activating the primary side full-bridge circuit to output the first primary side voltage to change the stray inductance current of the transformer (130) to a desired value for the fifth time duration; activating the secondary side full-bridge circuit to output the first secondary side voltage to transfer energy from the primary side to the secondary side for the sixth time duration; and activating the primary side full-bridge circuit (110) to output the second primary side voltage for the seventh time duration to transfer energy from the transformer (130)'s stray inductance to the secondary side to end the second normal operating cycle.

In some embodiments, the switch control circuit (140) is further configured to start the first normal operating cycle by activating the secondary side full-bridge circuit to output the second secondary side voltage for a fourth time duration.

In some embodiments, the fifth time duration is twice the first time duration, the sixth time duration is twice the second time duration, and the seventh time duration is twice the third time duration.

In some embodiments, the switch control circuit (140) is further configured to control the first normal operating cycle and the second normal operating cycle alternately until N cycles are completed, where N is a natural number.

In some embodiments, the switch control circuit (140) is further configured to control the active demagnetization phase by: activating the primary side full-bridge circuit with the voltage polarity opposite to the one used in the previously finished cycle N to change the current in the transformer (130)'s stray inductance to a desired value for the first time duration; activating the secondary side full-bridge circuit with the same polarity as the primary side full-bridge circuit to transfer energy from the primary side to the secondary side for the second time duration; and activating the primary side full-bridge circuit to output the second primary side voltage to transfer energy from the transformer (130)'s stray inductance to the secondary side for the third time duration to end the demagnetization phase.

In some embodiments, N is an odd number.

In some embodiments, the switch control circuit (140) is further configured to control to alternate between a first period and a second period, each of the first period and the second period including the start-up phase, N normal operating cycles, the active demagnetization phase and the free-wheeling phase, wherein the voltage polarity of activations of the primary side full-bridge circuit and the secondary side full-bridge circuit during the first period being opposite to the voltage polarity of activations of the primary side full-bridge circuit and the secondary side full-bridge circuit during the second period.

In some embodiments, the switch control circuit (140) is further configured to control a free-wheeling phase by deactivating both the primary side full-bridge circuit and the secondary side full-bridge circuit for an eighth time duration to allow residual magnetization currents to subside and to start over with the start-up phase.

In some embodiments, the eighth time duration is set to a fixed value such that a target demagnetization of the transformer (130) and a target energy transfer efficiency of the system are reached.

In some embodiments, the primary side full-bridge circuit is provided with a first set of actively controllable switches, each in antiparallel connection with a diode or having an intrinsic body diode, and the secondary side full-bridge circuit is provided with a second set of actively controllable switches, each in antiparallel connection with a diode or having an intrinsic body diode, and wherein during free-wheeling phase the switch control circuit (140) is further configured to switch off the first set of actively controllable switches and the second set of actively controllable switches to deactivate the primary side full-bridge circuit and the secondary side full-bridge circuit, and to cause the subsiding currents to free-wheel through the diodes.

In some embodiments, the system further comprises a measurement circuit configured to measure a voltage of the transformer (130), and end the free-wheeling phase when M times of zero crossings has been measured in the voltage, wherein M is a natural number.

As another example, some embodiments include a control method for a full-bridge DC/DC converter, the full-bridge DC/DC converter comprising at least a primary side full-bridge circuit (110), a secondary side full-bridge circuit (120) and a transformer (130), AC nodes of the primary side full-bridge circuit (110) being connected to a primary side of the transformer (130), and AC nodes of the secondary side full-bridge circuit (120) being connected to a secondary side of the transformer (130), the control method comprising: controlling (S710) the primary side full-bridge circuit (110) and the secondary side full-bridge circuit (120) to alternately operate between a normal operating phase and a free-wheeling phase, wherein, during the normal operating phase, modulation of an input voltage by the primary side full-bridge circuit (110) is performed to transfer power via the transformer (130), and, during the free-wheeling phase, the primary side full-bridge circuit (110) and the secondary side full-bridge circuit (120) are deactivated to reduce a magnetization current of the transformer (130).

BRIEF DESCRIPTION OF THE DRAWINGS

Features, advantages, and technical and industrial significance of exemplary embodiments of the teachings herein are described below with reference to the accompanying drawings, in which like numerals denote like elements, and wherein.

DETAILED DESCRIPTION

Figure 1:
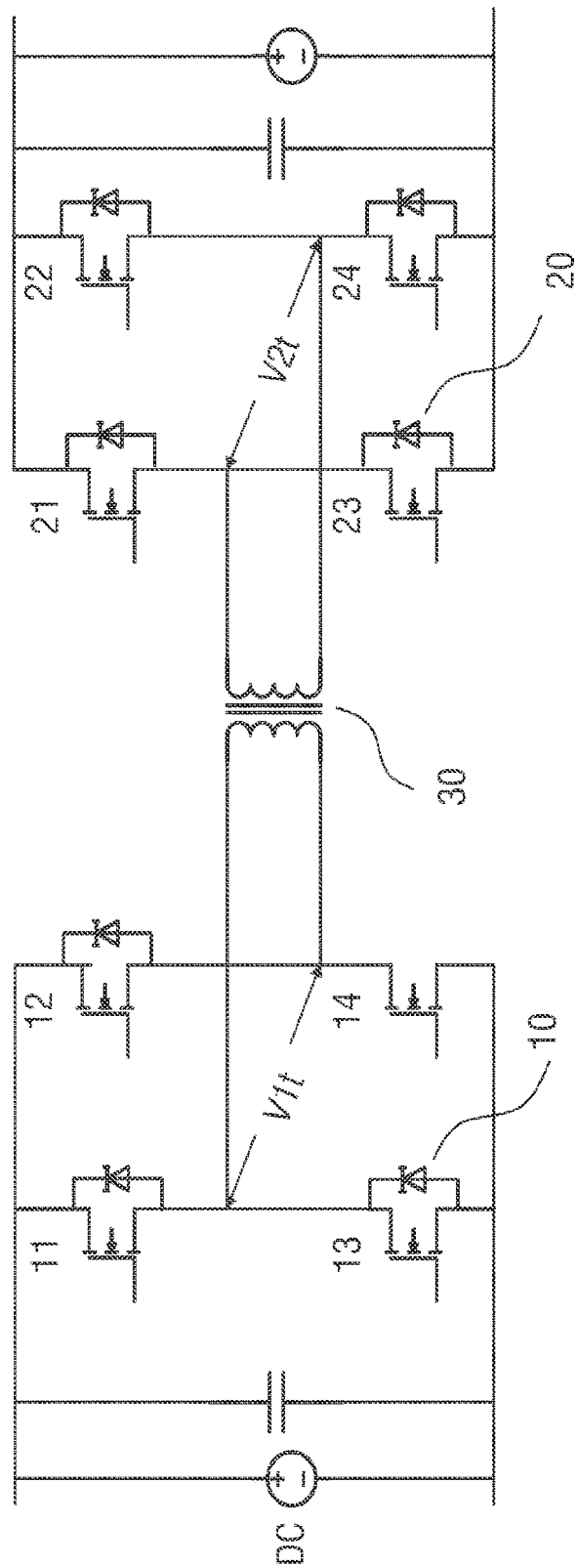
FIG. 1 is a schematic circuit diagram that illustrates one example of a full-bridge DC/DC converter incorporating teachings of the present disclosure.

In some embodiments, a DC/DC converter system comprises a full-bridge DC/DC converter and a switch control circuit. The full-bridge DC/DC converter comprises at least a primary side full-bridge circuit, a secondary side full-bridge circuit and a transformer, AC nodes of the primary side full-bridge circuit being connected to a primary side of the transformer, AC nodes of the secondary side full-bridge circuit being connected to a secondary side of the transformer. The switch control circuit is configured to: control the primary side full-bridge circuit and the secondary side full-bridge circuit to operate in a normal operating phase during which modulation of an input voltage by the primary side full-bridge circuit is performed to transfer power via the transformer; and control the primary side full-bridge circuit and the secondary side full-bridge circuit to operate in a free-wheeling phase during which the primary side full-bridge circuit and the secondary side full-bridge circuit are both deactivated to reduce the magnetization current of the transformer; and control the primary side full-bridge circuit and the secondary side full-bridge circuit to switch between the normal operating phase and the free-wheeling phase alternately.

With the above configuration, the normal operating phase is controlled to ensure the energy transfer power and direction and the free-wheeling phase is controlled to reduce or even eliminate magnetization current, and thus the magnetic saturation problem is effectively avoided. Furthermore, alternation of above two phases makes it possible to achieve a stable performance of the conversion.

In some embodiments, the switch control circuit is further configured to control during an active demagnetization phase the modulation of the input voltage by the primary side full-bridge circuit such that the magnetization current of the transformer is reduced to a preset threshold. With the active demagnetization phase occurring at the end of the normal operating phase and before the free-wheeling phase, the primary side full-bridge circuit and the secondary side full-bridge circuit are both deactivated during the free-wheeling phase to continue to reduce the magnetization current of the transformer further from the preset threshold.

In some embodiments, because magnetization current is usually larger at the end of the normal operating phase, an active demagnetization phase is added at the end of the normal operating phase to actively reduce the magnetization current of the transformer to a preset threshold. This way, the active demagnetization phase can still be used to transfer energy via the converter system, thus increasing the efficiency compared to only using free-wheeling demagnetization. Furthermore, the active demagnetization phase is configured before the free-wheeling phase, therefore, with the combination of the active demagnetization and the free-wheeling demagnetization, a better demagnetization effect is achieved.

In some embodiments, the switch control circuit is further configured to use the secondary side full-bridge circuit together with the primary side full-bridge circuit in the active demagnetization phase to reduce the magnetization current of the transformer to the preset threshold while transferring energy across the converter system.

In some embodiments, the secondary side full-bridge circuit on the other side is also employed together with the primary side full-bridge circuit, and thus the magnetization current of the transformer is better controlled.

In some embodiments, the switch control circuit is further configured to control during a start-up phase the modulation of the input voltage by the primary side full-bridge circuit in a way to reach a target operating point before entering the normal operating phase, with the start-up phase before the normal operating phase and after the free-wheeling phase.

In some embodiments, the modulation during the start-up phase makes it quicker to enter the normal operating phase.

In some embodiments, the switch control circuit is further configured to control in the start-up phase by: activating, at the end of the free-wheeling phase, the secondary side full-bridge circuit to output a second secondary side voltage at its AC nodes and the primary side full-bridge circuit to output a first primary side voltage for a first time duration long enough to change the transformer's stray inductance current to a desired value; activating, after the first time duration, the secondary side full-bridge circuit to output the first secondary side voltage to transfer energy for a second time duration long enough to transfer a first part of the energy from the primary side to the secondary side; and activating the primary side full-bridge circuit to output a second primary side voltage for a third time duration long enough to transfer a second part of the energy from the transformer's stray inductance to the secondary side to end the start-up phase, either of the first primary side voltage and the first secondary side being voltage larger than either of the second primary side voltage and the second secondary side voltage.

In some embodiments, the transformer's stray inductance is magnetized before the energy transfer for conversion such that the energy loss during the reactivations is reduced, and also the energy from the transformer's stray inductance to the secondary side is later transferred, and thus the system can more easily re-enter a steady energy transfer during the normal operating phase.

In some embodiments, the normal operating phase comprises a first normal operating cycle, and the switch control circuit is further configured to control in the normal operating phase by: activating the primary side full-bridge circuit to output a third primary side voltage and staying in this state for a fifth time duration long enough to reach a desired current in the transformer's stray inductance; activating the secondary side full-bridge circuit to output the third secondary side voltage to transfer energy from the primary side to the secondary side for a sixth time duration; and activating the primary side full-bridge circuit to output the second primary side voltage for a seventh time duration to transfer energy from the transformer's stray inductance to the secondary side to end the first normal operating cycle, either of the third primary side voltage and the third secondary side voltage being larger than either of the second primary side voltage and the second secondary side voltage, the polarity of the first primary side voltage or the first secondary side voltage being the opposite to the polarity of the third primary side voltage or the third secondary side voltage.

In some embodiments, the normal operating phase further comprises a second normal operating cycle after the first normal operating cycle, and the switch control circuit is further configured to control in the normal operating phase by: starting the second normal operating cycle by activating the secondary side full-bridge circuit to output the second secondary side voltage and activating the primary side full-bridge circuit to output the first primary side voltage to change the current in the transformer's stray inductance to a desired value for the fifth time duration; activating the secondary side full-bridge circuit to output the first secondary side voltage to transfer energy from the primary side to the secondary side for the sixth time duration; and activating the primary side full-bridge circuit to output the second primary side voltage for the seventh time duration to transfer energy from the transformer's stray inductance to the secondary side to end the second normal operating cycle.

In some embodiments, the first voltage (the first primary side voltage or the first secondary side voltage) during the second normal operating cycle has an opposite polarity of the third voltage (the third primary side voltage or the third secondary side voltage) during the first normal operating cycle, and thus accumulation of residual magnetization is effectively avoided.

In some embodiments, the switch control circuit is further configured to start the first normal operating cycle by activating the secondary side full-bridge circuit to output the second secondary side voltage for a fourth time duration.

In some embodiments, the switch control circuit is further configured to start the second normal operating cycle by activating the secondary side full-bridge circuit to output the second secondary side voltage for a fourth time duration.

In some embodiments, the second voltage (the second primary side voltage or the second secondary side voltage) is smaller than the first voltage and the third voltage, and thus the transformer's stray inductance is reliably magnetized and the energy is reliably transferred.

In some embodiments, the fifth time duration is twice the first time duration, the sixth time duration is twice the second time duration, and the seventh time duration is twice the third time duration. At the end of the normal operating phase, the same absolute magnetization and stray inductance current values as those at the end of the start-up phase or the beginning of the active demagnetization phase are achieved.

In some embodiments, the switch control circuit is further configured to control the first normal operating cycle and the second normal operating cycle alternately until N cycles are completed, wherein N is a natural number. The alternation of the first and second normal operating cycles simplifies the modulations while the energy transfer efficiency can be achieved. The switch control circuit is further configured to control in the active demagnetization phase by activating the primary side full-bridge circuit with the voltage polarity opposite to the one used in the previously finished cycle N to change the current in the transformer's stray inductance to a desired value for the first time duration; activating the secondary side full-bridge circuit with the same polarity as the primary side full-bridge circuit to transfer energy from the primary side to the secondary side for the second time duration; and activating the primary side full-bridge circuit to output the second primary side voltage to transfer energy from the transformer's stray inductance to the secondary side for the third time duration to end the demagnetization phase. The time duration of the active demagnetization phase corresponds to that of the start-up phase, a smaller current range during the normal operating phase is obtained and thus a smaller magnetization current is generated while the energy transfer efficiency is ensured. The number of cycles N is an odd number in an embodiment of the above system.

With the above configuration in which N is an odd number, it is ensured that the voltage in the last phase of any period and the voltage in the initial phase of the next period have the opposite voltage polarities, and thus accumulation of the residual magnetization is further avoided. The switch control circuit is further configured to control to alternate between a first period and a second period, each of the first period and the second period including the start-up phase, N normal operating cycles, the active demagnetization phase and the free-wheeling phase, wherein the voltage polarity of activations of the primary side full-bridge circuit and the secondary side full-bridge circuit during the first period being opposite to the voltage polarity of activations of the primary side full-bridge circuit and the secondary side full-bridge circuit during the second period. When N here is an odd number, it is ensured that the voltage in the last phase of any period and the voltage in the initial phase of the next period have the opposite voltage polarities, and thus accumulation of residual magnetization is further avoided. The switch control circuit is further configured to control in the free-wheeling phase by deactivating both the primary side full-bridge circuit and the secondary side full-bridge circuit for an eighth time duration to allow residual magnetization currents to subside and after that to start over with the start-up phase. The free-wheeling phase is accurately controlled, and thus the efficiency of the system can be ensured.

The primary side full-bridge circuit is provided with a first set of actively controllable switches, each in antiparallel connection with a diode or having an intrinsic body diode, and the secondary side full-bridge circuit is provided with a second set of actively controllable switches, each in antiparallel connection with a diode or having an intrinsic body diode, and wherein during the free-wheeling phase the switch control circuit is further configured to switch off the first set of actively controllable switches and the second set of actively controllable switches to deactivate the primary side full-bridge circuit and the secondary side full-bridge circuit, and to cause the subsiding currents to free-wheel through the diodes. By controlling the sets of actively controllable switches and their diodes, the easier and simpler control is implemented.

In some embodiments, the eighth time duration is set to a fixed value such that a target demagnetization of the transformer and a target energy transfer efficiency of the system are reached. A target demagnetization of the transformer and a target energy transfer efficiency of the system can be reached, and thus the quantified relation between energy transfer efficiency and demagnetization is obtained.

In some embodiments, the system further comprises a measurement circuit configured to measure a voltage of the transformer, and end the free-wheeling phase when M times of zero crossings in the voltage has been measured, wherein M is a natural number. With the above configuration, M times of zero crossings measured indicates that the magnetization current is sufficiently low during the free-wheeling phase.

In some embodiments, a control method for a full-bridge DC/DC converter comprises at least a primary side full-bridge circuit, a secondary side full-bridge circuit and a transformer, AC nodes of the primary side full-bridge circuit being connected to a primary side of the transformer, AC nodes of the secondary side full-bridge circuit being connected to a secondary side of the transformer, the control method comprising: controlling the primary side full-bridge circuit and the secondary side full-bridge circuit to alternately operate between a normal operating phase and a free-wheeling phase, wherein during the normal operating phase modulation of an input voltage by the primary side full-bridge circuit is performed to transfer power via the transformer, and during the free-wheeling phase the primary side full-bridge circuit and the secondary side full-bridge circuit are deactivated to reduce the transformer's magnetization current. The normal operating phase is controlled to ensure the energy transfer power and direction, and the free-wheeling phase is controlled to reduce or even eliminate the magnetization current, and thus the magnetic saturation problem is effectively avoided. Furthermore, alternation of the above two phases makes it possible to achieve a stable performance of the conversion.

In some embodiments, the control method further comprises: controlling, during an active demagnetization phase, the modulation of the input voltage by the primary side full-bridge circuit to reduce the magnetization current of the transformer to a preset threshold, wherein the active demagnetization phase occurs at the end of the normal operating phase and before the free-wheeling phase, and wherein, said controlling the primary side full-bridge circuit and the secondary side full-bridge circuit comprises: during the free-wheeling phase, the primary side full-bridge circuit and the secondary side full-bridge circuit are both deactivated to continue to reduce the transformer's magnetization current from the preset threshold.

With the above configuration, when the magnetization current is usually larger at the end of the normal operating phase, an active demagnetization phase is added at the end of the normal operating phase to actively reduce the transformer's magnetization current to a preset threshold. This way, the active demagnetization phase can still be used to transfer energy via the converter system. The energy transfer efficiency is improved, compared to the manner in which only free-wheeling demagnetization is employed. Furthermore, the active demagnetization phase is configured before the free-wheeling phase. Therefore, with the combination of the active demagnetization and the free-wheeling demagnetization, a better demagnetization effect is achieved.

In some embodiments, controlling in an active demagnetization phase comprises: using the secondary side full-bridge circuit together with the primary side full-bridge circuit in the active demagnetization phase to reduce the transformer's magnetization current to the preset threshold while transferring energy across the converter system. With the above configuration, the secondary side full-bridge circuit on the other side is also employed together with the primary side full-bridge circuit, and thus the transformer's magnetization current is better controlled.

In some embodiments, the control method further comprises: controlling, during a start-up phase, the modulation of the input voltage by the primary side full-bridge circuit in a way to reach a target operating point before entering the normal operating phase, with the start-up phase before the normal operating phase and after the free-wheeling phase. With the above configuration, modulation during the start-up phase makes it quicker to enter the normal operating phase.

In some embodiments, controlling in a start-up phase comprises: activating, at the end of the free-wheeling phase, the secondary side full-bridge circuit to output a second secondary side voltage at its AC nodes and the primary side full-bridge circuit to output a first primary side voltage for a first time duration long enough to increase the transformer's stray inductance current to a desired value; activating, after the first time duration, the secondary side full-bridge circuit to output the first secondary side voltage to transfer energy for a second time duration long enough to transfer a first part of the energy from the primary side to the secondary side; and activating the primary side full-bridge circuit to output a second primary side voltage for a third time duration long enough to transfer a second part of the energy from the transformer's stray inductance to the secondary side to end the start-up phase, either of the first primary side voltage and the first secondary side voltage being larger than either of the second primary side voltage and the second secondary side voltage. With the above configuration, the system can more easily re-enter a steady energy transfer during the normal operating phase.

In some embodiments, the normal operating phase comprises a first normal operating cycle, and said controlling in the normal operating phase comprises: controlling in the normal operating phase by: activating the primary side full-bridge circuit to output a third primary side voltage and staying in this state for a fifth time duration long enough to reach a desired current in the transformer's stray inductance; activating the secondary side full-bridge circuit to output the third secondary side voltage to transfer energy from the primary side to the secondary side for a sixth time duration; and activating the primary side full-bridge circuit to output the second primary side voltage for a seventh time duration to transfer energy from the transformer's stray inductance to the secondary side to end the first normal operating cycle, either of the third primary side voltage and the third secondary side voltage being larger than either of the second primary side voltage and the second secondary side voltage, the polarity of the first primary side voltage or the first secondary side voltage being the opposite to the polarity of the third primary side voltage or the third secondary side voltage. With the above configuration, the transformer's stray inductance is such magnetized before the energy transfer for conversion that the energy transfer loss due to the free-wheeling phase is reduced. And the system can more easily re-enter a steady energy transfer during the normal operating phase.

In some embodiments, the normal operating phase further comprises a second normal operating cycle after the first normal operating cycle, and said controlling in the normal operating phase further comprises: starting the second normal operating cycle by activating the secondary side full-bridge circuit to output the second secondary side voltage and activating the primary side full-bridge circuit to output the first primary side voltage to change the current in the transformer's stray inductance to a desired value for the fifth time duration; activating the secondary side full-bridge circuit to output the first secondary side voltage to transfer energy from the primary side to the secondary side for the sixth time duration; and activating the primary side full-bridge circuit to output the second primary side voltage for the seventh time duration to transfer energy from the transformer's stray inductance to the secondary side to end the second normal operating cycle. With the above configuration, the first voltage during the second normal operating cycle has an opposite polarity of the third voltage during the first normal operating cycle, and thus accumulation of residual magnetization is effectively avoided.

In some embodiments, controlling in the normal operating phase further comprises: starting the first normal operating cycle by activating the secondary side full-bridge circuit to output the second secondary side voltage for a fourth time duration.

In some embodiments, controlling in the normal operating phase further comprises: starting the second normal operating cycle by activating the secondary side full-bridge circuit to output the second secondary side voltage for a fourth time duration. With the above configuration, the absolute value of second voltage is smaller than the absolute values of the first voltage and the third voltage, and thus the transformer's stray inductance is reliably magnetized and the energy is reliably transferred.

In some embodiments, the fifth time duration is twice the first time duration, the sixth time duration is twice the second time duration, and the seventh time duration is twice the third time duration. With the above configuration, at the end of the normal operating phase, the same magnetization and stray inductance values as those at the end of the start-up phase or the beginning of the active demagnetization phase are achieved.

In some embodiments, controlling in the normal operating phase comprises: controlling the first normal operating cycle and the second normal operating cycle alternately until N cycles are completed, where N is a natural number. With the above configuration, the alternation of the first and second normal operating cycles simplifies the modulations while the energy transfer efficiency can be achieved.

In some embodiments, controlling in the active demagnetization phase comprises: activating the primary side full-bridge circuit with the voltage polarity opposite to the one used in the previously finished cycle N to change the current in the transformer's stray inductance to a desired value for the first time duration; activating the secondary side full-bridge circuit with the same polarity as the primary side full-bridge circuit to transfer energy from the primary side to the secondary side for the second time duration; and activating the primary side full-bridge circuit to output the second primary side voltage to transfer energy from the transformer's stray inductance to the secondary side for the third time duration to end the demagnetization phase. With the above configuration, the time duration of the active demagnetization phase corresponds to the that of the start-up phase, the smaller current range during the normal operating phase is obtained and thus a smaller magnetization current is generated while at the same time, the energy transfer efficiency is ensured.

In some embodiments, N is an odd number. With the above configuration, when N here is an odd number, it is ensured that the voltage in the last phase of any period and the voltage in the initial phase of the next period have the opposite voltage polarities, and thus accumulation of residual magnetization is further avoided.

In some embodiments, controlling in the normal operating phase comprises: controlling to alternate between a first period and a second period, each of the first period and the second period including the start-up phase, N normal operating cycles, the active demagnetization phase and the free-wheeling phase, wherein the voltage polarity of activations of the primary side full-bridge circuit and the secondary side full-bridge circuit during the first period being opposite to the voltage polarity of activations of the primary side full-bridge circuit and the secondary side full-bridge circuit during the second period. With the above configuration, when N here is an odd number, it is ensured that the voltage in the last phase of any period and the voltage in the initial phase of the next period have the opposite voltage polarities, and thus accumulation of residual magnetization is further avoided.

In some embodiments, controlling in the free-wheeling phase comprises: deactivating both the primary side full-bridge circuit and the secondary side full-bridge circuit for an eighth time duration to allow residual magnetization currents to subside and after that to start over with the start-up phase. With the above configuration, the free-wheeling phase is accurately controlled, and thus the efficiency of the system can be ensured.

In some embodiments, the primary side full-bridge circuit is provided with a first set of actively controllable switches, each in antiparallel connection with a diode or having an intrinsic body diode, and the secondary side full-bridge circuit is provided with a second set of actively controllable switches, each in antiparallel connection with a diode or having an intrinsic body diode, and wherein said controlling in the normal operating phase comprises: switching off the first set of actively controllable switches and the second set of actively controllable switches to deactivate the primary side full-bridge circuit and the secondary side full-bridge circuit, and to cause the subsiding currents to free-wheel through the diodes. With the above configuration, by controlling the sets of actively controllable switches and their diodes, the easier and simpler control is implemented.

In some embodiments, the eighth time duration is set to a fixed value such that a target demagnetization of the transformer and a target energy transfer efficiency of the system are reached. With the above configuration, a target demagnetization of the transformer and a target energy transfer efficiency of the system can be reached, and thus the quantified relation between energy transfer efficiency and demagnetization is obtained.

In some embodiments, the control method further comprises: measuring a voltage of the transformer, and end the free-wheeling phase when M times of zero crossings has been measured in the voltage, where M is a natural number. With the above configuration, M times of zero crossings measured indicates that the magnetization current is sufficiently low during the free-wheeling phase.

Hereinafter, an example DC/DC converter system and control method for a full-bridge DC/DC converter incorporating teachings of the present disclosure are described with reference to the drawings. The detailed description set forth below in connection with the appended drawings is intended as a description of an example embodiments and is not intended to represent the only embodiments in which the teachings herein can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments. In some instances, some devices are shown in block diagram form.

FIG. 1 is a schematic circuit diagram that illustrates one example of the full-bridge DC/DC converter. As shown in the figure, a dual active bridge DC/DC converter is shown in typical topology where the primary side full-bridge circuit 10, the secondary side full-bridge circuit 20 and the high frequency isolation transformer 30 are shown. The dual active bridge DC/DC converter may also comprise the primary side capacitor C1, the secondary capacitor C2 and additional storage inductance LS that is not shown in the figure. The primary full bridge is located in the primary side of the transformer and the secondary side full-bridge is located in the transformer secondary side. Also, the primary side capacitor C1 may be connected in parallel at the DC nodes of the primary full bridge, the secondary side capacitance C2 may be connected in parallel at the DC nodes of the secondary side full-bridge, and the inductance LS may be connected in series to the transformer, for example on the secondary side. The transformer ratio may be n1:n2, where n1 and n2 may be positive numbers, for example, positive integers. On the left hand side, the primary side full-bridge circuit includes controllable switch 11, controllable switch 12, controllable switch 13 and the controllable switch 14, and the secondary side full-bridge circuit includes a controllable switch 21, controllable switch 22, controllable switch 23 and the controllable switch 24, each of the controllable switches being shunted by either an intrinsic body diode or an external additional diode. It is assumed that the power input on the left hand side as DC may be converted to DC on the right hand side, during which the primary side capacitor C1 and the secondary side capacitance C2 may act to stabilize the respective voltage.

In the converter as shown in FIG. 1, it is found that due to slight asymmetries caused by the modulation or part tolerances, the voltage applied on the transformer magnetizing inductance may include a small DC portion on overage. This portion drives a DC current through the magnetizing inductance which may lead to a saturation of the transformer.

Figure 2A:
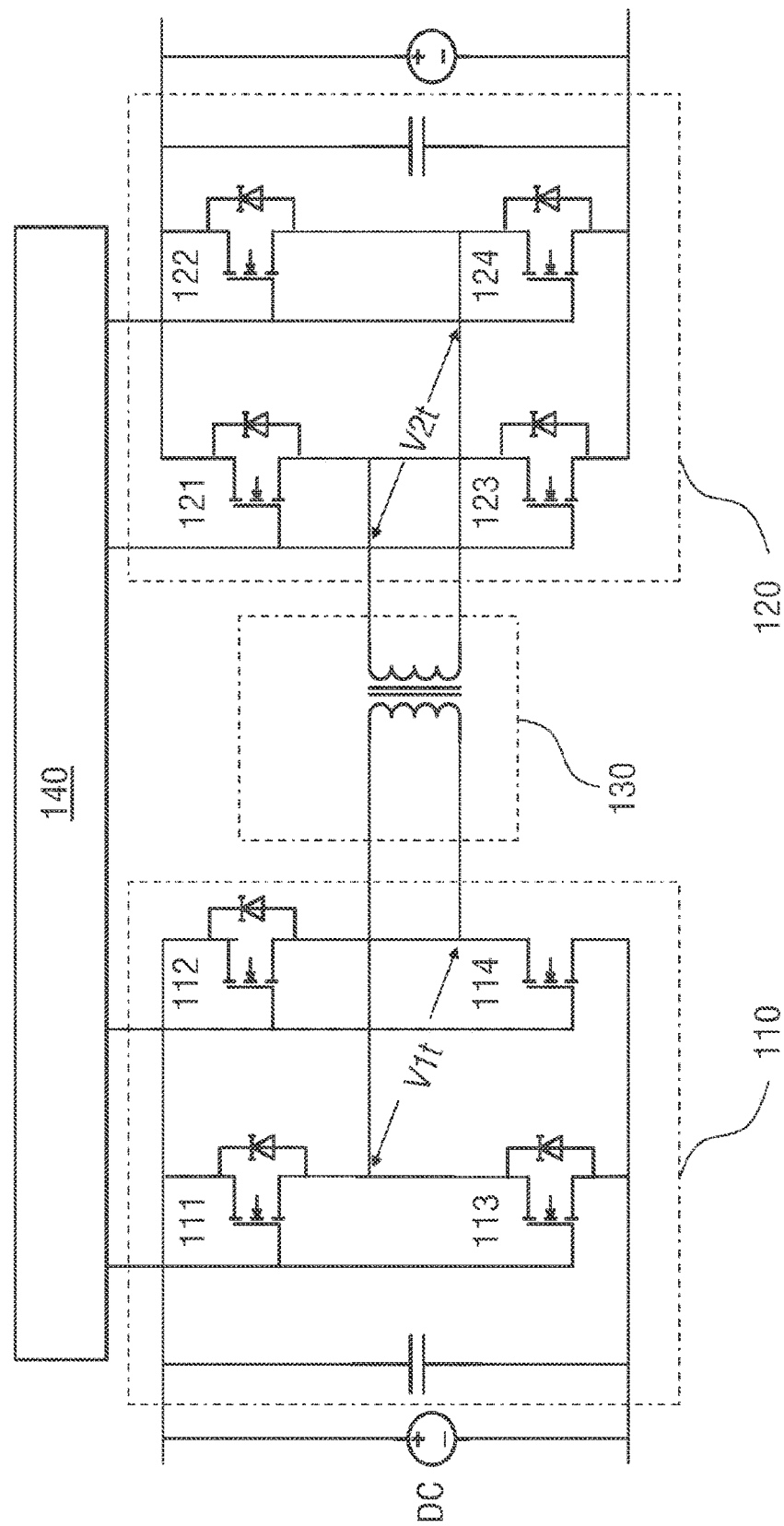
FIG. 2A is a schematic circuit diagram illustrates the DC/DC converter system for a full-bridge DC/DC converter incorporating teachings of the present disclosure.

FIG. 2A is a schematic circuit diagram illustrating the DC/DC converter system including the full-bridge DC/DC converter according to one embodiment of the invention. The DC/DC converter system includes the full-bridge DC/DC converter and a switch control circuit 140. The full-bridge DC/DC converter includes at least a primary side full-bridge circuit 110, a secondary side full-bridge circuit 120 and a transformer 130. AC nodes of the primary side full-bridge circuit 110 are connected to a primary side of the transformer 130, and AC nodes of the secondary side full-bridge circuit 120 are connected to a secondary side of the transformer 130. The switch control circuit 140 is configured to: control the primary side full-bridge circuit 110 and the secondary side full-bridge circuit 120 to operate in a normal operating phase during which modulation of an input voltage by the primary side full-bridge circuit 110 is performed to transfer power via the transformer 130, for example, to generate a secondary side voltage of the transformer 130 via the primary side voltage of the transformer 130 or to generate a secondary side current of the transformer 130; and control the primary side full-bridge circuit 110 and the secondary side full-bridge circuit 120 to operate in a free-wheeling phase during which the primary side full-bridge circuit 110 and the secondary side full-bridge circuit 120 are both deactivated to reduce the transformer 130's magnetization current; and control the primary side full-bridge circuit 110 and the secondary side full-bridge circuit 120 to switch between the normal operating phase and the free-wheeling phase alternately.

In some embodiments, the primary side full-bridge circuit or secondary side full-bridge circuit can be used as a rectifying circuit depending on the direction in which energy transfers. For example, when energy is transferred from the primary side full-bridge circuit to the secondary side full-bridge circuit, the secondary side full-bridge circuit may be implemented as a rectifying circuit, and when energy is transferred from the secondary side full-bridge circuit to the primary side full-bridge circuit, the primary side full-bridge circuit may be implemented as a rectifying circuit.

In some embodiments, the secondary side full-bridge circuit is embodied as a rectifying circuit. The control for the full-bridge DC/DC converter comprises at least two phases, with first phase being a normal operating phase during which the converter is operated normally, e.g. using phase-shift modulation, to transfer energy and second phase being a free-wheeling phase during which the controllable switches in the full-bridge parts of the converter are disabled. This allows the remaining magnetization to continue driving a current through the antiparallel diodes or body diodes of the switches, thereby leading to a voltage reducing that current and thereby the remaining magnetization.

Furthermore, the switch control circuit 140 may also be referred to as a controller, and may be configured as a signal generation circuit that activates or deactivates the primary side full-bridge circuit and the secondary side full-bridge circuit by transmitting on/off signals to at least part of the switches (e.g. actively controllable switches) therein.

Figure 2B:
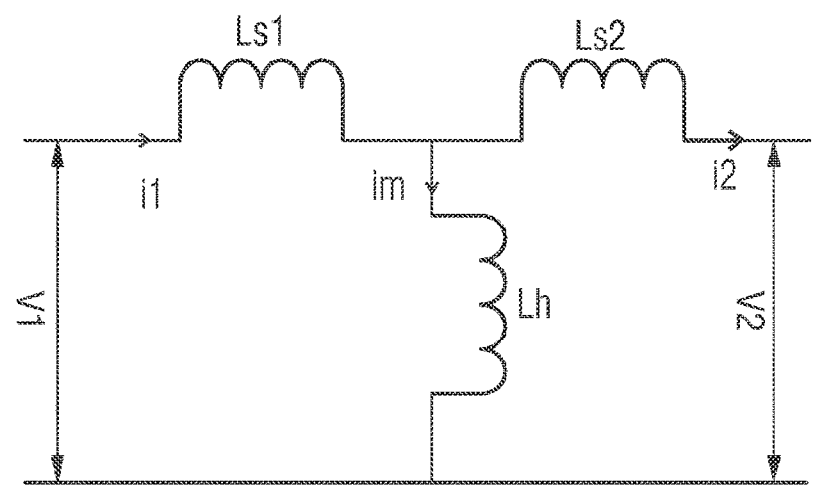
FIG. 2B is a schematic circuit diagram of the central dotted area of FIG. 2A that illustrates stray inductance and magnetization inductance of a transformer incorporating teachings of the present disclosure.

FIG. 2B is an equivalent circuit diagram of the dotted area of FIG. 2A that illustrates stray inductance and magnetization inductance of a transformer incorporating teachings of the present disclosure. In the following figures, it can be assumed that the inductance Ls2 is a lot larger than the inductance Ls1 and thus, the inductance Ls1 can be neglected. The inductances Ls1 and Ls2, for example, may include the parasitic inductance and leakage inductance in the circuit and so on. They can also include an additional storage inductance. It noted that circuit topology is not schematic and should not be considered as limitation of the circuit connection or topology.

Furthermore, as shown in the figure, the current $i_1$ through the stray inductance Ls1, current $i_2$ through the stray inductance Ls2 and the current $i_m$ through the transformer's magnetizing inductance are generated with voltages V1 and V2 applied. Therefore, the stray inductance current can be calculated as $(i_1+i_2)/2$, and the magnetization current $i_m$ may be calculated as (i1−i2), wherein $i_1$, $i_2$ here may be of a positive or negative value.

Back to FIG. 2A, the free-wheeling phase demagnetizes at least part of the residual magnetization generated during the normal (energy transfer) modulation, and thus the magnetic saturation phenomenon is avoided without complicated measurement of the magnetization and subsequent adjustments of the modulation. In order to minimize the impact to the energy transfer efficiency, it is important to be able to reach the desired operating point as fast as possible when restarting the normal modulation after the free-wheeling phase. For this, in the one embodiment of the invention, a start-up phase may be inserted between after the freewheeling phase and before the normal operating phase during which the magnetizations of both the magnetizing inductance and stray inductance are adjusted to a value close to the one at the beginning of a cycle during the normal operation phase.

Figure 3A:
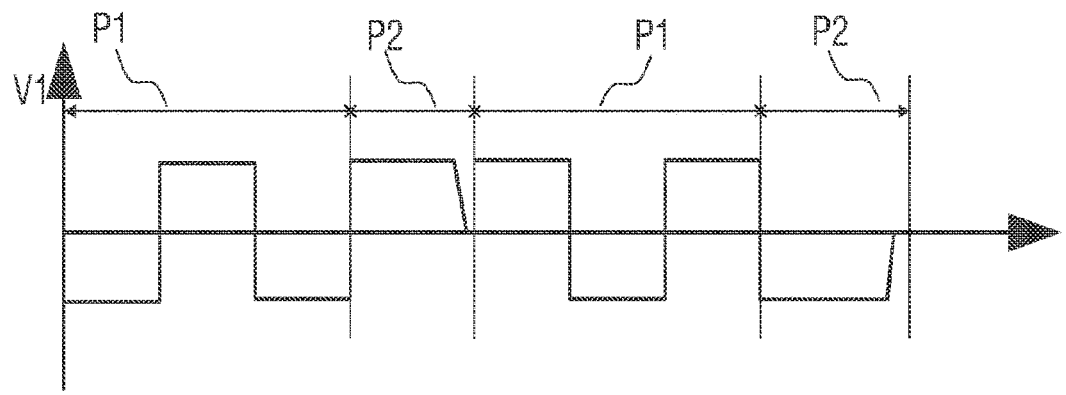
FIG. 3A is a graph that shows one example of the output voltage of a primary side full-bridge circuit incorporating teachings of the present disclosure.

FIG. 3A is a graph that shows one example of the output voltage V1 of a primary side full-bridge circuit incorporating teachings of the present disclosure. Phases of control and waveforms of the voltages in the control are explained in combination with FIG. 2B. As shown in the figure, P1 represents the normal operating phase and P2 represents the free-wheeling phase.

Figure 3B:
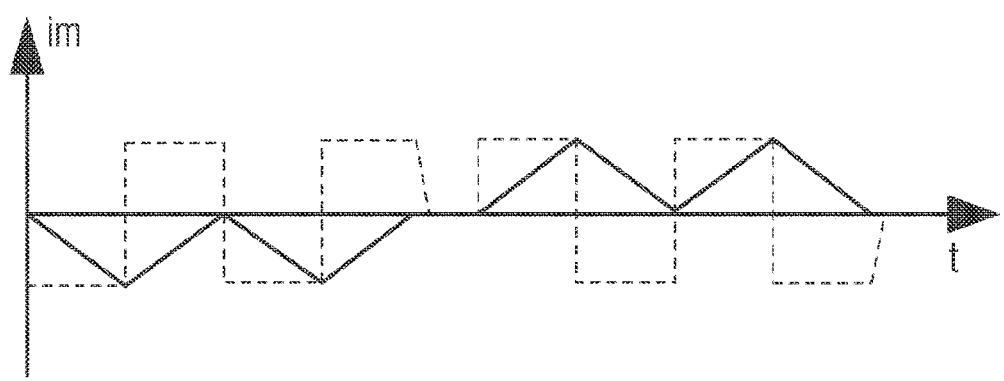
FIG. 3B is a graph that shows the magnetization current generated by the output voltage of FIG. 3A.

FIG. 3B is a graph that shows the magnetization current generated by the output voltage of FIG. 3A. As shown in the figure, magnetization current (i1−i2) or $i_m$ generated by the output voltage becomes larger as voltage applied lasts in each cycle, and during the free-wheeling phase P2, magnetization current will drop until it reaches to a small value, for example, the preset small threshold value.

For example, with the circuit topology of FIG. 2B, the magnetization current can be represented by $i_m$ or (i1−i2) with V1 and V2 applied. V1 and V2 are output voltages of the primary side full-bridge circuit and secondary side full-bridge circuit, respectively. In one example, V2 and V1 may have the same or similar waveform, and are applied synchronously. In another example, V2 and V1 may be applied by staggering the timing of voltage applied (for example, in the such way as FIGS. 5A and 5B). It should be noted that the waveform of stray inductance current is only schematically shown and may be subject to change in different examples.

As shown in the graph, at the beginning of the free-wheeling phase P2, the intrinsic body diodes start free-wheeling, so magnetization current will start dropping while the voltage may stay constant for a while or change its sign if there is remaining stray inductance current. The voltage may drop to zero when the stray inductance current goes to zero or a swinging may occur caused by parasitic capacitances together with the system's inductances.

In some embodiments, the preset small threshold value has a zero value or a value close to zero which is preset according to targeted residual magnetization to be obtained, or through experience or testing. With the above configuration, the normal operating phase is controlled to ensure the energy transfer power and direction and the free-wheeling phase is controlled to reduce or even eliminate magnetization current, and thus the magnetic saturation problem is effectively avoided. Furthermore, alternation of above two phases makes it possible to achieve a stable performance of the conversion.

Figure 4A:
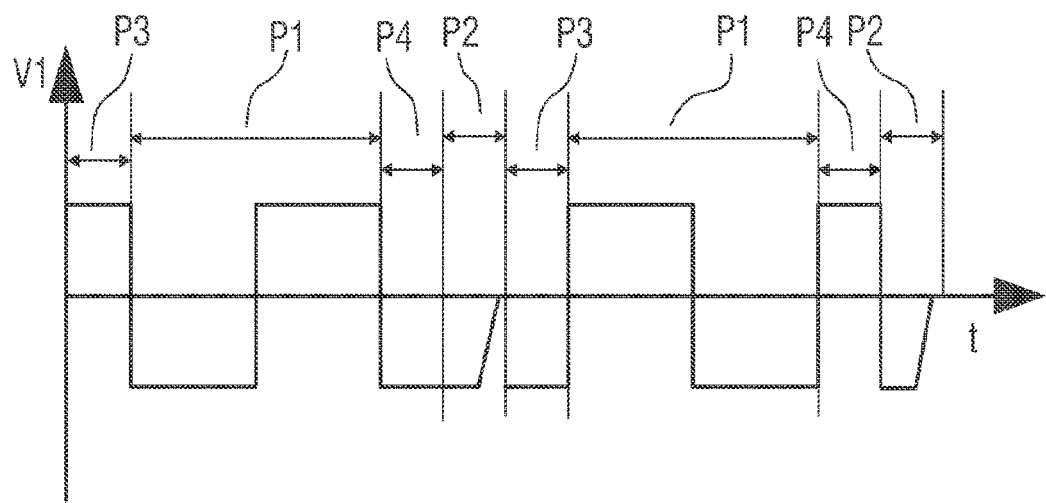
FIG. 4A is a graph that shows one example of the output voltage of a primary side full-bridge circuit incorporating teachings of the present disclosure.

In some embodiments, the switch control circuit is further configured to control during an active demagnetization phase the modulation of the input voltage by the primary side full-bridge circuit to reduce the magnetization current of the transformer to a preset threshold, wherein the active demagnetization phase occurs at the end of the normal operating phase and before the free-wheeling phase. During the free-wheeling phase, the primary side full-bridge circuit and the secondary side full-bridge circuit are both deactivated by the switch control circuit to continue to reduce the transformer's magnetization current from the preset threshold. In an example, different phases are described with reference to FIGS. 4A and 4B. FIG. 4A is a graph that shows one example of the output voltage V1 of a primary side full-bridge circuit incorporating teachings of the present disclosure. Phases of control and waveforms of the voltages in the control are explained in combination with FIG. 2B. As shown in the figure, P1 represents the normal operating phase and P2 represents the free-wheeling phase. P3 represents the start-up phase and P4 represents the active demagnetization phase.

With the above configuration, when an undesired offset of the magnetization current may appear at the end of any normal operating cycle during the normal operating phase, an active demagnetization phase is added at the end of the normal operating phase to actively reduce the transformer's magnetization current to a preset threshold, allowing to use the time for demagnetization for continuing the energy transfer and thereby reducing the negative impact of the demagnetization on the efficiency. Furthermore, the active demagnetization phase is configured before the free-wheeling phase, therefore, with the combination of the active demagnetization and the free-wheeling demagnetization, a better demagnetization effect is achieved.

In some embodiments, the switch control circuit is further configured to use the secondary side full-bridge circuit together with the primary side full-bridge circuit in the active demagnetization phase to reduce the transformer's magnetization current to the preset threshold while transferring energy across the converter system. With the above configuration, the secondary side full-bridge circuit on the other side is also employed together with the primary side full-bridge circuit, and thus the transformer's magnetization current is better controlled.

In some embodiments, the switch control circuit is further configured to control during a start-up phase the modulation of the input voltage by the primary side full-bridge circuit in a way to reach a target operating point before entering the normal operating phase, with the start-up phase before the normal operating phase and after the free-wheeling phase. With the above configuration, modulation during the start-up phase makes it quicker to enter the normal operating phase.

Figure 4B:
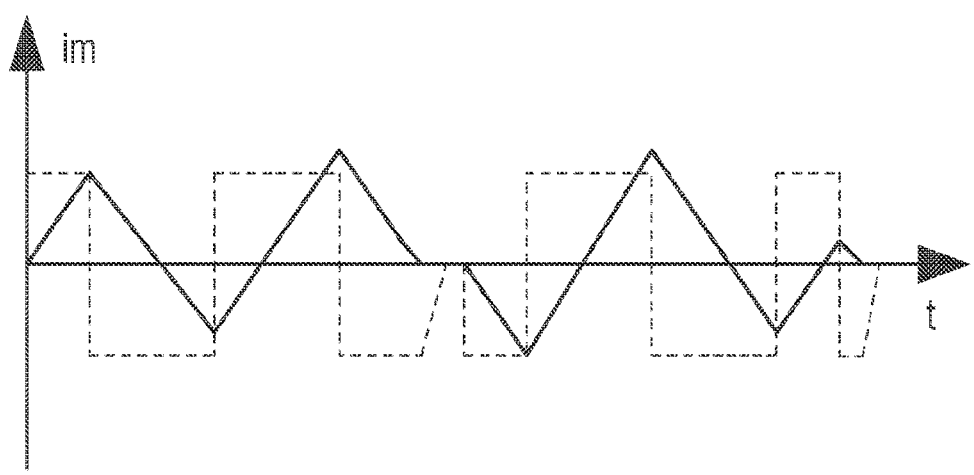
FIG. 4B is a graph that shows the magnetization current generated by the output voltage of FIG. 4A.

Back to FIG. 4B which is a graph that shows the stray inductance current generated by the output voltage of FIG. 4A. As shown in the figure, the stray inductance current (i1+i2)/2 generated by the output voltage becomes larger as voltage is applied in each cycle, and during the free-wheeling phase P2, magnetization current will drop until it reaches to a small value, for example, the preset small threshold value. In some embodiments, the preset small threshold value has a zero value or a value close to zero which is preset according to targeted residual magnetization to be obtained, or through experience or testing.

For example, with the circuit topology of FIG. 2B, the magnetization current can be represented by im or (i1−i2) with V1 and V2 applied. V1 and V2 are the output voltages of the primary side full-bridge circuit and secondary side full-bridge circuit, respectively. In one example, the output voltages V2 and V1 may have the same or similar waveform, and are applied synchronously. In another example, the output voltages V2 and V1 may be applied by staggering the timing of voltage applied (for example, in the such way as FIGS. 5A and 5B).

As shown in the graph, at the beginning of the free-wheeling phase P2, the intrinsic body diodes start free-wheeling, so magnetization current will start dropping and may stay constant for a while if there is remaining stray inductance and abruptly drops to zero when the stray inductance goes to zero.

In comparison with FIGS. 3A and 3B, for a certain cycle length, the start-up phase P3 inserted reduces the range of the magnetization current on Y-axis due to less accumulation of voltage of single polarity. Therefore, the start-up phase added can generally decrease the magnetization current in the transformer and thus reduce chances of magnetic saturation. Also, the active demagnetization phase P4 further pulls the value down to a much smaller value and thus small residual current reducing the required free-wheeling time and increasing efficiency. Also, the active demagnetization phase P4 can be accurately controlled through modulation, the residual current may not be entirely eliminated so there may still be residual current due to some systematic error which, as discussed above, is related to the problem solved by the invention. The free-wheeling phase starts after the active demagnetization phase P4, and the small value (preset threshold value) is further decreased to zero or almost zero. Residual magnetization problem is therefore radically fixed.

In some embodiments, the switch control circuit is further configured to control in the start-up phase by: activating, at the end of the free-wheeling phase, the secondary side full-bridge circuit to output a second secondary side voltage at its AC nodes and the primary side full-bridge circuit to output a first primary side voltage for a first time duration long enough to increase the transformer's stray inductance current to a desired value; activating, after the first time duration, the secondary side full-bridge circuit to output the first secondary side voltage to transfer energy for a second time duration long enough to transfer a first part of the energy from the primary side to the secondary side; and activating the primary side full-bridge circuit to output a second primary side voltage for a third time duration long enough to transfer a second part of the energy from the transformer's stray inductance to the secondary side to end the start-up phase, either of the first primary side voltage and the first secondary side voltage being larger than either of the second primary side voltage and the second secondary side voltage. With the above configuration, the transformer's stray inductance is such magnetized before the energy transfer for conversion that the energy transfer loss due to the free-wheeling phase is reduced. And the system can more easily re-enter a steady energy transfer during the normal operating phase.

Figure 5A:
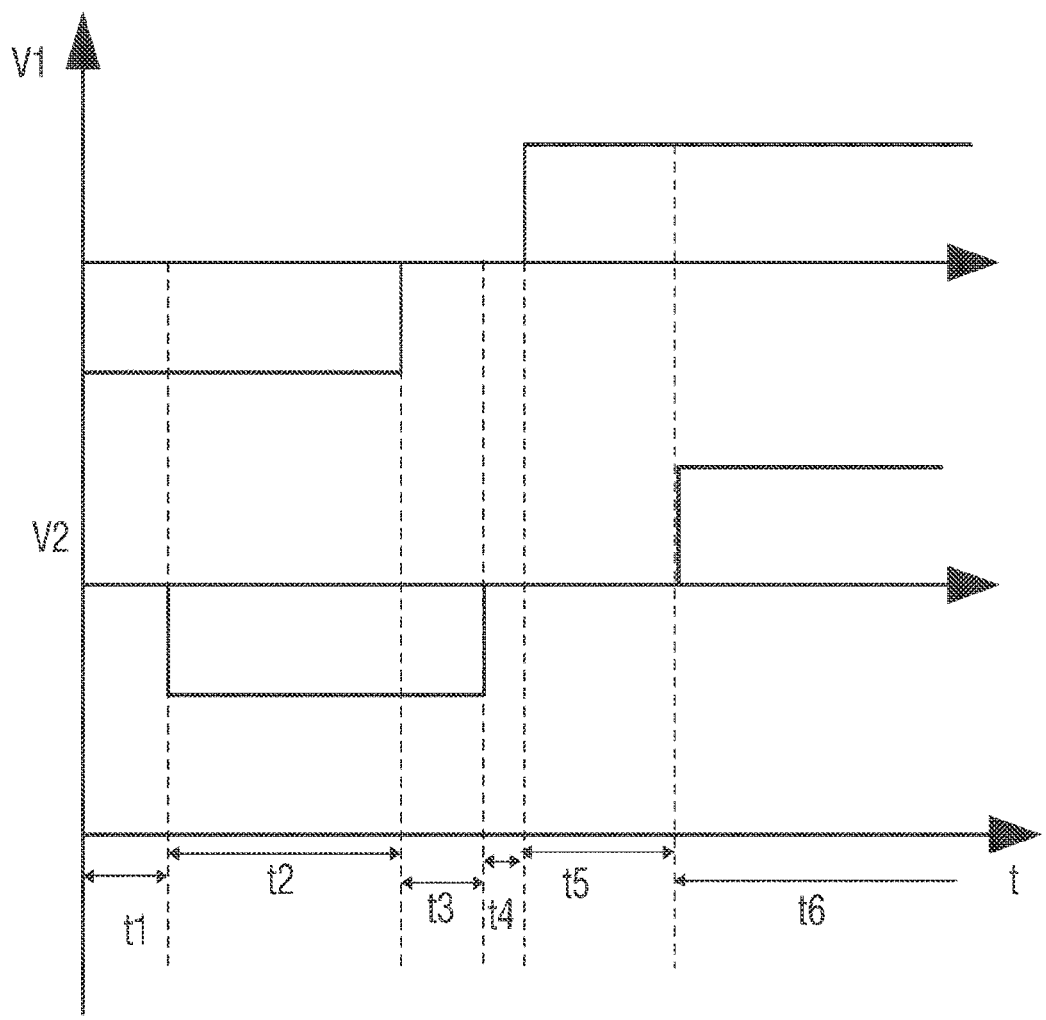
FIG. 5A is a nomogram that shows output voltages of a primary side full-bridge circuit and secondary side full-bridge circuit in the start-up phase incorporating teachings of the present disclosure.

FIG. 5A is a nomogram that shows output voltages of a primary side full-bridge circuit and secondary side full-bridge circuit in the start-up phase incorporating teachings of the present disclosure. As shown in the figure, the first time duration t1, the second time duration t2 and the third time duration t3 are schematically shown. The lengths of the segments in this figure representing the time durations are not accurately or proportionally illustrated. With the waveform in the figure, in the start-up phase, the energy loss during the activations is reduced while the energy transfer efficiency is guaranteed.

In some embodiments, the normal operating phase comprises a first normal operating cycle, and the switch control circuit is further configured to control in the normal operating phase by: activating the primary side full-bridge circuit to output a third primary side voltage and staying in this state for a fifth time duration long enough to reach a desired current in the transformer's stray inductance; activating the secondary side full-bridge circuit to output the third secondary side voltage to transfer energy from the primary side to the secondary side for a sixth time duration; and activating the primary side full-bridge circuit to output the second primary side voltage for a seventh time duration to transfer energy from the transformer's stray inductance to the secondary side to end the first normal operating cycle, either of the third primary side voltage and the third secondary side voltage being larger than either of the second primary side voltage and the second secondary side voltage, the polarity of the first primary side voltage or the first secondary side voltage being the opposite to the polarity of the third primary side voltage or the third secondary side voltage. With the above configuration, the transformer's stray inductance is magnetized before the normal operating phase. Thus, the energy transfer loss caused by the free-wheeling phase is reduced. And the system can more easily re-enter a steady energy transfer state during the normal operating phase.

For example, the second voltage may be equal to zero or any value that is smaller than the first voltage and the third voltage. The first voltage and the third voltage have different polarities, for example, the first voltage may be a positive voltage (e.g. 300V). The third voltage may be a negative voltage (e.g. –300V). The absolute values of the first voltage and the third voltage may be equal and close to each other. In another embodiment, the first voltage may be a negative voltage and the third voltage may be a positive voltage. For example, the first voltage may be –600V and the third voltage may be 600V.

In some embodiments, the second voltage may also be positive or negative and has a smaller absolute value than the first voltage and the third voltage. For example, the second voltage may be 0.5V and may vary in sign and amount over time.

Figure 5B:
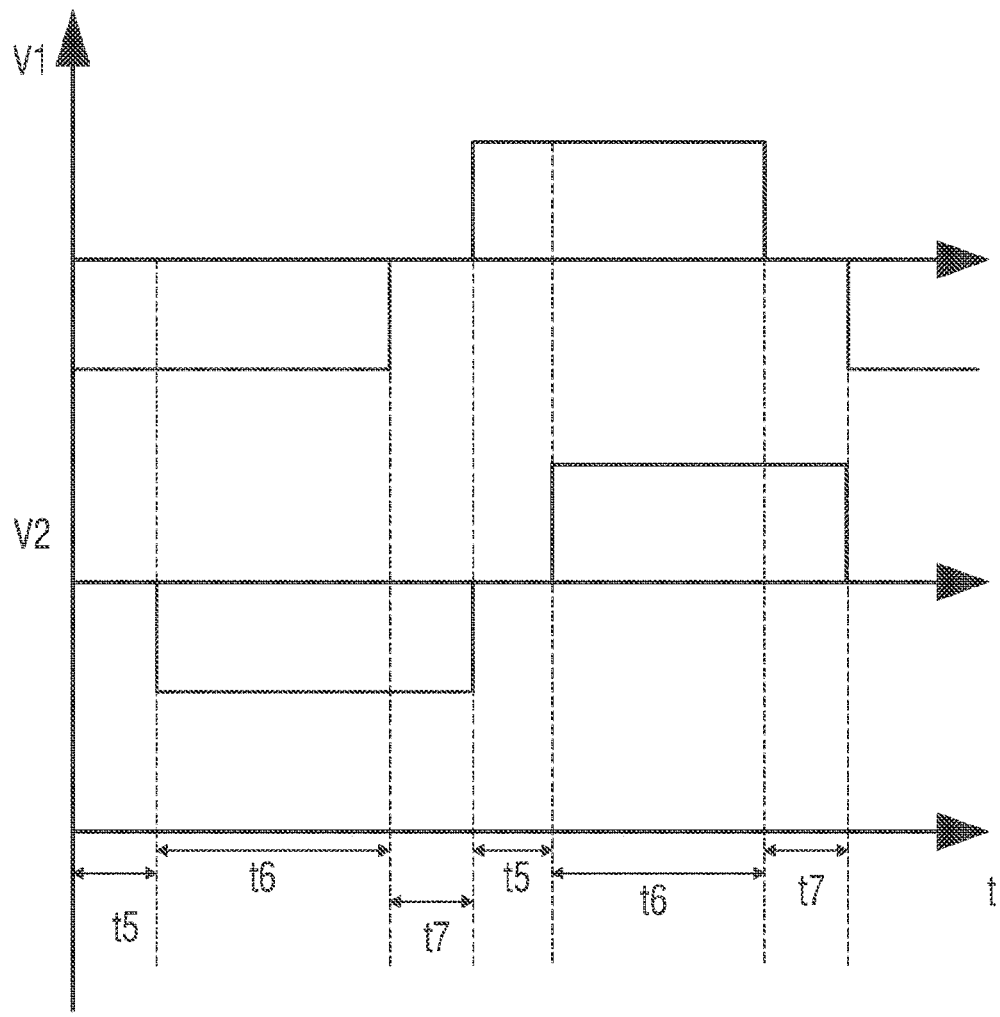
FIG. 5B is a nomogram that shows output voltages of a primary side full-bridge circuit and secondary side full-bridge circuit in the normal operating phase incorporating teachings of the present disclosure.

FIG. 5B is a nomogram that shows output voltages of a primary side full-bridge circuit and secondary side full-bridge circuit in the normal operating phase incorporating teachings of the present disclosure. As shown in the figure, the fifth time duration t5, sixth time duration t6 and seventh time duration t7 are schematically shown. It is noted that the lengths of the segments representing the time durations are not proportionally illustrated.

In some embodiments, the normal operating phase further comprises a second normal operating cycle after the first normal operating cycle, and the switch control circuit is further configured to control in the normal operating phase by: starting the second normal operating cycle by activating the secondary side full-bridge circuit to output the second secondary side voltage and activating the primary side full-bridge circuit to output the first secondary side voltage to change the current in the transformer's stray inductance to a desired value for the fifth time duration; activating the secondary side full-bridge circuit to output the first secondary side voltage to transfer energy from the primary side to the secondary side for the sixth time duration; and activating the primary side full-bridge circuit to output the second primary side voltage for the seventh time duration to transfer energy from the transformer's stray inductance to the secondary side to end the second normal operating cycle. With the above configuration, the first voltage during the second normal operating cycle has an opposite polarity of the third voltage during the first normal operating cycle, and thus accumulation of residual magnetization is effectively avoided.

In some embodiments, the switch control circuit is further configured to start the first normal operating cycle by activating the secondary side full-bridge circuit to output the second secondary side voltage for a fourth time duration t4. With the above configuration, the second voltage is smaller than the first voltage and the third voltage, and thus the transformer's stray inductance is reliably magnetized and energy stored is better transferred.

In some embodiments, the fifth time duration is twice the first time duration, the sixth time duration is twice the second time duration, and the seventh time duration is twice the third time duration. With the above configuration, at the end of the normal operating phase, the same magnetization and stray inductance values as those at the end of the start-up phase or the beginning of the active demagnetization phase are achieved.

In some embodiments, the switch control circuit is further configured to control the first normal operating cycle and the second normal operating cycle alternately until N cycles are completed, where N is a natural number. With the above configuration, the alternation of the first and second normal operating cycles simplifies the modulations.

In some embodiments, the switch control circuit is further configured to control in the active demagnetization phase by activating the primary side full-bridge circuit with the voltage polarity opposite to the one used in the previously finished normal cycle N to change the current in the transformer's stray inductance to a desired value for the first time duration; activating the secondary side full-bridge circuit with the same polarity as the primary side full-bridge circuit to transfer energy from the primary side to the secondary side for the second time duration; and activating the primary side full-bridge circuit to output the second primary side voltage to transfer energy from the transformer's stray inductance to the secondary side for the third time duration to end the demagnetization phase. With the above configuration, the time duration of the active demagnetization phase corresponds to the that of the start-up phase, a smaller current range during the normal operating phase is obtained and thus a smaller magnetization current is generated while at the same time, the energy transfer efficiency is ensured.

In some embodiments, N is an odd number. With the above configuration, when N herein is an odd number, it is ensured that the voltage in the last phase of any period and the voltage in the initial phase of the next period have the opposite voltage polarities, and thus accumulation of residual magnetization is further avoided.

In some embodiments, the switch control circuit is further configured to control to alternate between a first period and a second period, each of the first period and the second period including the start-up phase, N normal operating cycles, the active demagnetization phase and the free-wheeling phase, wherein the voltage polarity of activations of the primary side full-bridge circuit and the secondary side full-bridge circuit during the first period being opposite to the voltage polarity of activations of the primary side full-bridge circuit and the secondary side full-bridge circuit during the second period. With the above configuration, when N here is an odd number, it is ensured that the voltage in the last phase of any period and the voltage in the initial phase of the next period have the opposite voltage polarities, and thus accumulation of residual magnetization is further avoided.

In some embodiments, the switch control circuit is further configured to control in free-wheeling phase by deactivating both the primary side full-bridge circuit and the secondary side full-bridge circuit for an eighth time duration t8 to allow residual magnetization currents to subside and to start over with the start-up phase. With the above configuration, the free-wheeling phase is accurately controlled, and thus the efficiency of the system can be ensured.

In some embodiments, the primary side full-bridge circuit is provided with a first set of actively controllable switches, each having an intrinsic antiparallel body diode or being in antiparallel connection with an additional external diode, and the secondary side full-bridge circuit is provided with a second set of actively controllable switches each in antiparallel connection with a diode or having an intrinsic body diode, and wherein during the free-wheeling phase the switch control circuit is further configured to switch off the first set of actively controllable switches and the second set of actively controllable switches to deactivate the primary side full-bridge circuit and the secondary side full-bridge circuit, and to cause the subsiding currents to free-wheel through the diodes. With the above configuration, by controlling the sets of actively controllable switches and their diodes, the easier and simpler control is implemented.

In some embodiments, the eighth time duration is set to a fixed value such that a target demagnetization of the transformer and a target energy transfer efficiency of the system are reached. With the above configuration, a target demagnetization of the transformer and a target energy transfer efficiency of the system can be reached, and thus the quantified relation between energy transfer efficiency and demagnetization is obtained.

In some embodiments, the switch control circuit further comprises a measurement circuit configured to measure a voltage of the transformer, and end the free-wheeling phase when M times of zero crossings has been measured in the voltage, where M is a natural number. With the above configuration, M times of zero crossings measured indicates that the magnetization current is sufficiently low during the free-wheeling phase.

Figure 6A:
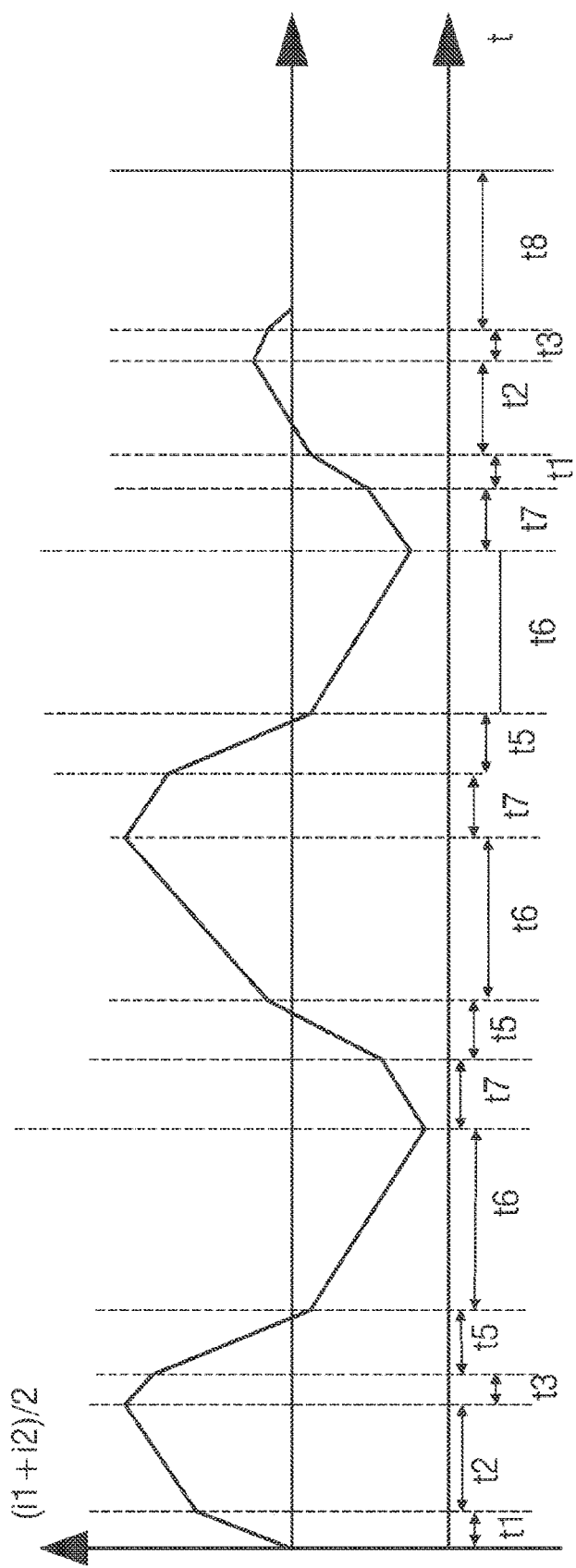
FIG. 6A is a complete waveform graph of stray inductance current generated by output voltage of a primary side full-bridge circuit and secondary side full-bridge circuit incorporating teachings of the present disclosure.

FIG. 6A is a complete waveform graph of stray inductance current generated by the output voltage of a primary side full-bridge circuit and secondary side full-bridge circuit incorporating teachings of the present disclosure. For example, with the circuit topology of FIG. 2B, stray inductance current can be represented by (i1+i2)/2 with V1 and V2 applied. V1 and V2 are output voltages of the primary side full-bridge circuit and secondary side full-bridge circuit, respectively. It should be noted that the waveform of stray inductance current is only schematically shown and may be subject to change in different examples.

Figure 6B:
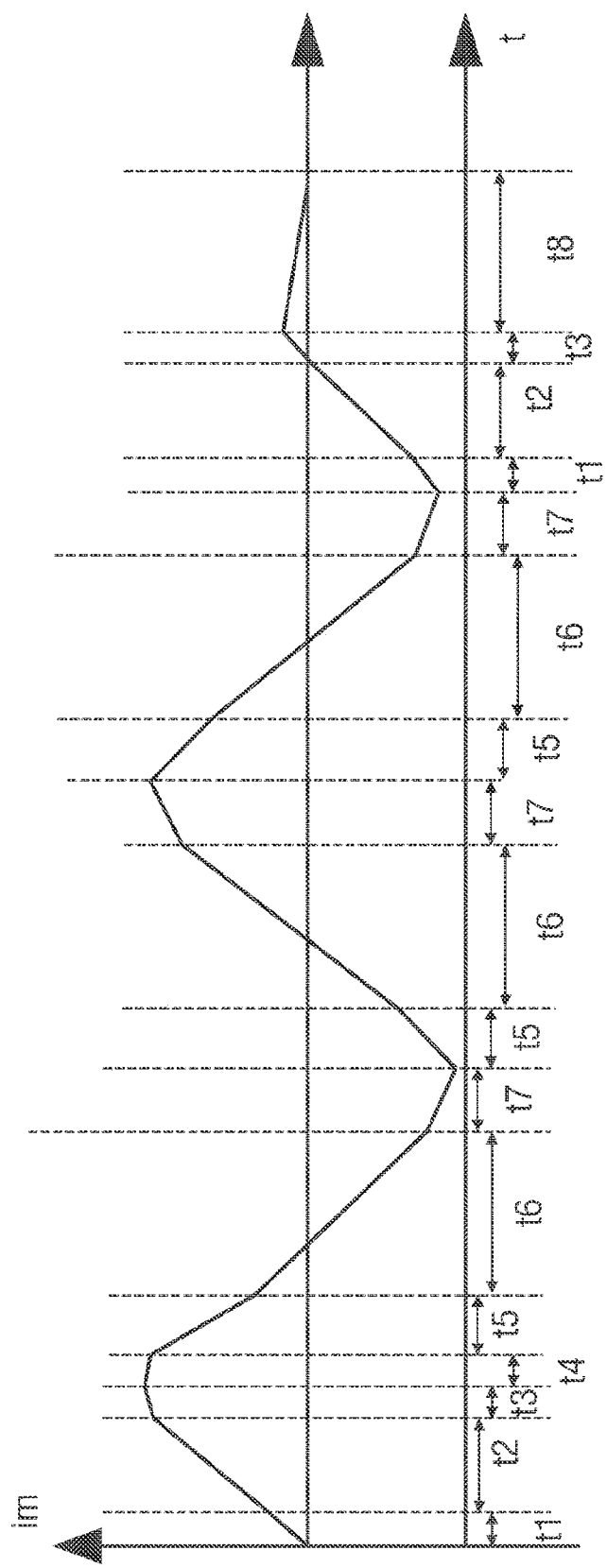
FIG. 6B is a complete waveform graph of magnetization current generated by output voltage of a primary side full-bridge circuit and secondary side full-bridge circuit incorporating teachings of the present disclosure.

FIG. 6B is a complete waveform graph of magnetization current generated by output voltage of a primary side full-bridge circuit and secondary side full-bridge circuit incorporating teachings of the present disclosure. For example, with the circuit topology of FIG. 2B, the magnetization current can be represented by $i_m$ or (i1−i2) with the output voltages V1 and V2 applied. V1 and V2 are output voltages of the primary side full-bridge circuit and secondary side full-bridge circuit, respectively. It should be noted that the waveform of the stray inductance current is only schematically shown and may be subject to change in different embodiments.

As shown in the above figures, the control of the converter is subject to the above sequential phases with N being 3. However, it should be noted that the number of cycles may vary. Also, in FIG. 6A, no fourth time duration t4 is shown, and it should be noted that there may be the fourth time duration between the third time duration t3 and the fifth time duration t5 as well as between the seventh time duration t7 and the fifth time duration t5. Also, the fourth time duration t4 in FIG. 6B can be omitted in other embodiments. The current lines in FIGS. 6A and 6B indicate changes in each of the stray inductance current and the magnetization current generated in the converter. Their slopes are only exemplary and may vary in different embodiments.

Figure 7:
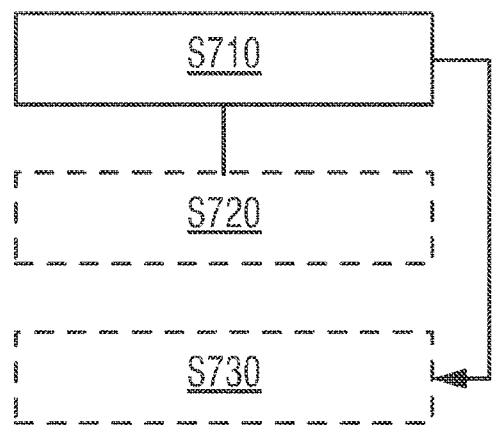
FIG. 7 is a flowchart that illustrates a control method of the full-bridge DC/DC converter incorporating teachings of the present disclosure.

FIG. 7 is a flowchart that illustrates a control method of the full-bridge DC/DC converter incorporating teachings of the present disclosure. As shown in the figure, a control method for a full-bridge DC/DC converter is provided. Similar to the full-bridge DC/DC converter in the FIG. 2A, the full-bridge DC/DC converter of the embodiment comprises at least a primary side full-bridge circuit, a secondary side full-bridge circuit and a transformer, AC nodes of the primary side full-bridge circuit being connected to the primary side of the transformer, AC nodes of the secondary side full-bridge circuit being connected to a secondary side of the transformer. The control method comprising:

S710: controlling the primary side full-bridge circuit 110 and the secondary side full-bridge circuit 120 to alternately operate in a normal operating phase and a free-wheeling phase, wherein during the normal operating phase modulation of an input voltage by the primary side full-bridge circuit 110 is performed to transfer power via the transformer 130, and during the free-wheeling phase the primary side full-bridge circuit 110 and the secondary side full-bridge circuit 120 are deactivated to reduce the transformer 130's magnetization current. With the above method, the normal operating phase is controlled to ensure the energy transfer power and direction and the free-wheeling phase is controlled to reduce or even eliminate magnetization current, and thus the magnetic saturation problem is effectively avoided. Furthermore, the alternation of above two phases makes it possible to achieve a stable performance of the circuit.

In some embodiments, the primary side full-bridge circuit is provided with a first set of actively controllable switches, each in antiparallel connection with an diode or having an intrinsic body diode, and the secondary side full-bridge circuit is provided with a second set of actively controllable switches, each in antiparallel connection with a diode or having an intrinsic body diode, and wherein said controlling in the normal operating phase comprises: switching off the first set of actively controllable switches and the second set of actively controllable switches to deactivate the primary side full-bridge circuit and the secondary side full-bridge circuit, and to cause the subsiding currents to free-wheel through the diodes.

In some embodiments, the eighth time duration is set to a fixed value such that a target demagnetization of the transformer and a target energy transfer efficiency of the system are reached.

In some embodiments, the control method further comprises: S720: controlling during an active demagnetization phase the modulation of the input voltage by the primary side full-bridge circuit to reduce the magnetization current of the transformer to a preset threshold, wherein the active demagnetization phase occurs at the end of the normal operating phase and before the free-wheeling phase, and wherein said controlling the primary side full-bridge circuit and the secondary side full-bridge circuit comprises: during the free-wheeling phase, the primary side full-bridge circuit and the secondary side full-bridge circuit are both deactivated to continue to reduce the transformer's magnetization current from the preset threshold.

In some embodiments, controlling in an active demagnetization phase comprises: using the secondary side full-bridge circuit together with the primary side full-bridge circuit in the active demagnetization phase to reduce the transformer's magnetization current to the preset threshold while transferring energy across the converter system.

In some embodiments, the control method further comprises: S730: controlling during a start-up phase the modulation of the input voltage by the primary side full-bridge circuit in a way to reach a target operating point before entering the normal operating phase, with the start-up phase before the normal operating phase and after the free-wheeling phase.

In some embodiments, controlling in a start-up phase comprises: activating, at the end of the free-wheeling phase, the secondary side full-bridge circuit to output a second secondary side voltage at its AC nodes and the primary side full-bridge circuit to output a first primary side voltage for a first time duration long enough to increase the transformer's stray inductance current to a desired value; activating, after the first time duration, the secondary side full-bridge circuit to output the first secondary side voltage to transfer energy for a second time duration long enough to transfer a first part of the energy from the primary side to the secondary side; and activating the primary side full-bridge circuit to output a second primary side voltage for a third time duration long enough to transfer a second part of the energy from the transformer's stray inductance to the secondary side to end the start-up phase, either of the first primary side voltage and the first secondary side voltage being larger than either of the second primary side voltage and the second secondary side voltage.

In some embodiments, the normal operating phase comprises a first normal operating cycle, and said controlling in the normal operating phase comprises: controlling in the normal operating phase by: activating the primary side full-bridge circuit to output a third primary side voltage and staying in this state for a fifth time duration long enough to reach a desired current in the transformer's stray inductance; activating the secondary side full-bridge circuit to output the third secondary side voltage to transfer energy from the primary side to the secondary side for a sixth time duration; and activating the primary side full-bridge circuit to output the second primary side voltage for a seventh time duration to transfer energy from the transformer's stray inductance to the secondary side to end the first normal operating cycle, either of the third primary side voltage and the third secondary side voltage being larger than either of the second primary side voltage and the second secondary side voltage, the polarity of the first primary side voltage or the first secondary side voltage being the opposite to the polarity of the third primary side voltage or the third secondary side voltage.

In some embodiments, the normal operating phase further comprises a second normal operating cycle after the first normal operating cycle, and said controlling in the normal operating phase further comprises: starting the second normal operating cycle by activating the secondary side full-bridge circuit to output the second secondary side voltage and activating the primary side full-bridge circuit to output the first primary side voltage to change the current in the transformer's stray inductance to a desired value for the fifth time duration; activating the secondary side full-bridge circuit to output the first secondary side voltage to transfer energy from the primary side to the secondary side for the sixth time duration; and activating the primary side full-bridge circuit to output the second primary side voltage for the seventh time duration to transfer energy from the transformer's stray inductance to the secondary side to end the second normal operating cycle.

In some embodiments, controlling in the normal operating phase further comprises: starting the first normal operating cycle by activating the secondary side full-bridge circuit to output the second secondary side voltage for a fourth time duration.

In some embodiments, the fifth time duration is twice the first time duration, the sixth time duration is twice the second time duration, and the seventh time duration is twice the third time duration.

In some embodiments, controlling in the normal operating phase comprises: controlling the first normal operating cycle and the second normal operating cycle alternately until N cycles are completed, where N is a natural number.

In some embodiments, controlling in the active demagnetization phase comprises: activating the primary side full-bridge circuit with the voltage polarity opposite to the one used in the previously finished cycle N to change the current in the transformer's stray inductance to a desired value for the first time duration; activating the secondary side full-bridge circuit with the same polarity as the primary side full-bridge circuit to transfer energy from the primary side to the secondary side for the second time duration; and activating the primary side full-bridge circuit to output the second primary side voltage to transfer energy from the transformer's stray inductance to the secondary side for the third time duration to end the demagnetization phase.

In some embodiments, N is an odd number. With the above configuration, when N here is an odd number, it is ensured that the voltage in the last phase of any period and the voltage in the initial phase of the next period have the opposite voltage polarities, and thus accumulation of residual magnetization is further avoided.

In some embodiments, controlling in the normal operating phase comprises: controlling to alternate between a first period and a second period, each of the first period and the second period including the start-up phase, N normal operating cycles, the active demagnetization phase and the free-wheeling phase, wherein the voltage polarity of activations of the primary side full-bridge circuit and the secondary side full-bridge circuit during the first period being opposite to the voltage polarity of activations of the primary side full-bridge circuit and the secondary side full-bridge circuit during the second period.

In some embodiments, controlling in the free-wheeling phase comprises: deactivating both the primary side full-bridge circuit and the secondary side full-bridge circuit for an eighth time duration to allow residual magnetization currents to subside and after that to start over with the start-up phase.

In some embodiments, the control method further comprises: measuring a voltage of the transformer, and end the free-wheeling phase when M times of zero crossings has been measured in the voltage, where M is a natural number.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, means for rectifying may comprise a rectifier circuit that may be any of the rectifier circuits described above or any combination thereof. Furthermore, means for averaging may comprise an averaging circuit.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software or a combination of both depends upon the particular application and design constraints imposed on the overall system. The described functionality may be implemented in varying ways for each particular application, but such implementation decisions should not be interpreted as causing a departure from the scope of the embodiments of the teachings here.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, switch control circuit, microswitch control circuit, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal or in the converter. In the alternative, the processor and the storage medium may reside as discrete components in a user terminal or in the converter.

For purposes of summarizing the disclosure, certain aspects, advantages and novel features of the inventions have been described herein. It is to be understood that not necessarily all such advantages may be achieved in accordance with any particular embodiment of the teachings herein. Thus, the teachings may be embodied or carried out in a manner that achieves or optimizes one advantage or group of advantages as taught herein without necessarily achieving other advantages as may be taught or suggested herein.

Further variations and modifications are possible within the scope of the appended claims.

What is claimed is:

1. A DC/DC converter system comprising:
   a switch control circuit; and
   a full-bridge DC/DC converter including a primary side full-bridge circuit, a secondary side full-bridge circuit, and a transformer;
   wherein AC nodes of the primary side full-bridge circuit are connected to a primary side of the transformer and AC nodes of the secondary side full-bridge circuit are connected to a secondary side of the transformer; and
   the switch control circuit is configured to control the primary side full-bridge circuit and the secondary side full-bridge circuit to:
   operate in a normal operating phase during which modulation of an input voltage by the primary side full-bridge circuit transfers power via the transformer;
   operate in a free-wheeling phase during which the primary side full-bridge circuit and the secondary side full-bridge circuit are both deactivated to reduce the transformer's magnetization current;

switch between the normal operating phase and the free-wheeling phase alternately;

during an active demagnetization phase, control the modulation of the input voltage by the primary side full-bridge circuit to reduce the magnetization current of the transformer to a preset threshold, wherein the active demagnetization phase occurs at the end of the normal operating phase and before the free-wheeling phase;

during the free-wheeling phase, deactivate both the primary side full-bridge circuit and the secondary side full-bridge circuit to continue to reduce the transformer's magnetization current from the preset threshold;

during a start-up phase before the normal operating phase and after the free-wheeling phase, control modulation of the input voltage by the primary side full-bridge circuit such that a target operating point is reached before entering the normal operating phase.

2. The system according to claim 1, wherein the switch control circuit is further configured to use the secondary side full-bridge circuit together with the primary side full-bridge circuit in the active demagnetization phase to reduce the magnetization current of the transformer to the preset threshold while transferring energy across the converter system.

3. The system according to claim 1, wherein the normal operating phase comprises a first normal operating cycle, and the switch control circuit is further configured to control the normal operating phase by:

activating the primary side full-bridge circuit to put out a third primary side voltage and staying in this state for a fifth time duration long enough to reach a desired current in the transformer's stray inductance;

activating the secondary side full-bridge circuit to put out a third secondary side voltage to transfer energy from the primary side to the secondary side for a sixth time duration; and activating the primary side full-bridge circuit to put out the second primary side voltage for a seventh time duration to transfer energy from the transformer's stray inductance to the secondary side to end the first normal operating cycle, either of the third primary side voltage and the third secondary side voltage being larger than either of the second primary side voltage and the second secondary side voltage, the polarity of the first primary side voltage or the first secondary side voltage being the opposite to the polarity of the third primary side voltage or the third secondary side voltage.

4. The system according to claim 3, wherein:

the normal operating phase further comprises a second normal operating cycle after the first normal operating cycle; and the switch control circuit is further configured to control in the normal operating phase by:

starting the second normal operating cycle by activating the secondary side full-bridge circuit to put out the second secondary side voltage and activating the primary side full-bridge circuit to output the first primary side voltage to change the stray inductance current of the transformer to a desired value for the fifth time duration;

activating the secondary side full-bridge circuit to put out the first secondary side voltage to transfer energy from the primary side to the secondary side for the sixth time duration; and activating the primary side full-bridge circuit to put out the second primary side voltage for the seventh time duration to transfer energy from the transformer's stray inductance to the secondary side to end the second normal operating cycle.

5. The system according to claim 3, wherein the switch control circuit is further configured to start the first normal operating cycle by activating the secondary side full-bridge circuit to put out the second secondary side voltage for a fourth time duration.

6. The system according to claim 3, wherein the fifth time duration is twice the first time duration, the sixth time duration is twice the second time duration, and the seventh time duration is twice the third time duration.

7. The system according to claim 4, wherein the switch control circuit is further configured to control the first normal operating cycle and the second normal operating cycle alternately until N cycles are completed, where N is a natural number.

8. The system according to claim 7, wherein the switch control circuit is further configured to control the active demagnetization phase by:

activating the primary side full-bridge circuit with the voltage polarity opposite to the one used in the previously finished cycle N to change the current in the transformer's stray inductance to a desired value for the first time duration;

activating the secondary side full-bridge circuit with the same polarity as the primary side full-bridge circuit to transfer energy from the primary side to the secondary side for the second time duration; and activating the primary side full-bridge circuit to put out the second primary side voltage to transfer energy from the transformer's stray inductance to the secondary side for the third time duration to end the demagnetization phase.

9. The system according to claim 7, wherein N is an odd number.

10. The system according to claim 9, wherein the switch control circuit is further configured to alternate between a first period and a second period, each of the first period and the second period including the start-up phase, N normal operating cycles, the active demagnetization phase and the free-wheeling phase, wherein the voltage polarity of activations of the primary side full-bridge circuit and the secondary side full-bridge circuit during the first period opposite to the voltage polarity of activations of the primary side full-bridge circuit and the secondary side full-bridge circuit during the second period.

11. The system according to claim 8, wherein the switch control circuit is further configured to control a free-wheeling phase by deactivating both the primary side full-bridge circuit and the secondary side full-bridge circuit for an eighth time duration to allow residual magnetization currents to subside and to start over with the start-up phase.

12. The system according to claim 11, wherein the eighth time duration is set to a fixed value such that a target demagnetization of the transformer and a target energy transfer efficiency of the system are reached.

13. The system according to claim 1, wherein the primary side full-bridge circuit is provided with a first set of actively controllable switches, each in antiparallel connection with a diode or having an intrinsic body diode, and the secondary side full-bridge circuit is provided with a second set of actively controllable switches, each in antiparallel connection with a diode or having an intrinsic body diode, and wherein during free-wheeling phase the switch control circuit is further configured to switch off the first set of actively controllable switches and the second set of actively controllable switches to deactivate the primary side full-bridge circuit and the secondary side full-bridge circuit, and to cause the subsiding currents to free-wheel through the diodes.

14. The system according to claim 1, wherein the switch control circuit operates to end the free-wheeling phase when M times of zero crossings occur in a voltage of the transformer, wherein M is a natural number.

15. A control method for a full-bridge DC/DC converter comprising a primary side full-bridge circuit, a secondary side full-bridge circuit, and a transformer, wherein AC nodes of the primary side full-bridge circuit are connected to a primary side of the transformer, and AC nodes of the secondary side full-bridge circuit are connected to a secondary side of the transformer, the method comprising:

controlling the primary side full-bridge circuit and the secondary side full-bridge circuit to alternately operate between a normal operating phase and a free-wheeling phase, wherein the normal operating phase includes modulating an input voltage by the primary side full-bridge circuit to transfer power via the transformer, and the free-wheeling phase includes deactivating the primary side full-bridge circuit and the secondary side full-bridge circuit to reduce a magnetization current of the transformer;

during an active demagnetization phase, modulating the input voltage using the primary side full-bridge circuit to reduce the magnetization current of the transformer to a preset threshold, wherein the active demagnetization phase occurs at the end of the normal operating phase and before the free-wheeling phase;

during the free-wheeling phase, deactivating both the primary side full-bridge circuit and the secondary side full-bridge circuit to continue to reduce the transformer's magnetization current from the preset threshold;

during a start-up phase before the normal operating phase and after the free-wheeling phase, modulating the input voltage using the primary side full-bridge circuit such that a target operating point is reached before entering the normal operating phase.

* * * * *